United States Patent [19]

Takechi et al.

[11] Patent Number: 4,596,913
[45] Date of Patent: Jun. 24, 1986

[54] IMPEDER FOR ELECTRIC RESISTANCE TUBE WELDING

[75] Inventors: Hiroshi Takechi; Mitsuo Yoshizawa; Hiroshi Nougata; Hirohisa Ichihara, all of Kimitsushi, Japan

[73] Assignee: Nippon Steel Corporation, Tokyo, Japan

[21] Appl. No.: 719,042

[22] Filed: Apr. 4, 1985

Related U.S. Application Data

[63] Continuation of Ser. No. 626,595, Jul. 5, 1984, abandoned, which is a continuation of Ser. No. 377,996, May 13, 1982, abandoned.

[30] Foreign Application Priority Data

May 19, 1981 [JP] Japan .................................. 57-74249

[51] Int. Cl.$^4$ ............................................. H05B 6/02
[52] U.S. Cl. ..................................... 219/8.5; 219/59.1
[58] Field of Search ............. 219/8.5, 7.5, 10.43, 219/59.1, 61.2, 61.7

[56] References Cited

U.S. PATENT DOCUMENTS

| 1,948,154 | 2/1934 | Adams, Jr. | 219/8.5 |
| 2,059,300 | 11/1936 | Adams, Jr. | 219/8.5 |
| 3,379,853 | 4/1968 | Domizi | 219/8.5 |
| 3,584,176 | 6/1971 | Cannon et al. | 219/8.5 |
| 3,619,535 | 11/1971 | Sullivan | 219/8.5 |
| 3,648,005 | 3/1972 | Rudd | 219/8.5 |
| 3,763,342 | 10/1973 | Oppenheimer | 219/8.5 X |
| 4,268,736 | 5/1981 | Cuvelier | 219/8.5 |

FOREIGN PATENT DOCUMENTS

| 0004989 | 10/1979 | European Pat. Off. | |
| 55-10390 | 1/1980 | Japan | 219/8.5 |

Primary Examiner—Philip H. Leung
Attorney, Agent, or Firm—Wenderoth, Lind & Ponack

[57] ABSTRACT

An impeder for use in an apparatus for resistance tube welding by which a strip-shaped skelp continuously formed into a tubular or spirally tubular shape having spaced opposed edge portions defining a gap therebetween has the edge portions heated and pressed together for being welded. The impeder has a generally tubular casing and a core within the casing consisting of a plurality of laminated bodies each consisting of a plurality of substantially flat planar foils of metallic magnetic material, the core, when viewed in cross-section traverse to the central longitudinal axis of the casing, having the transverse cross-sections of the laminated bodies on parts of at least one circle concentric with the longitudinal axis of the casing and having the planes of the foils extending substantially radially outwardly from the longitudinal axis.

3 Claims, 20 Drawing Figures

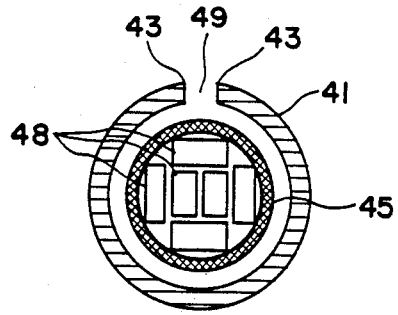
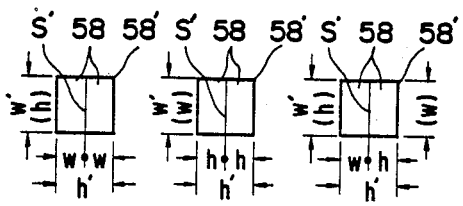
Fig. 4
Fig. 5(a) Fig. 5(b) Fig. 5(c)
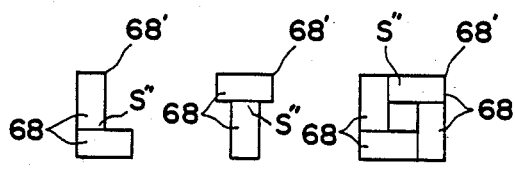
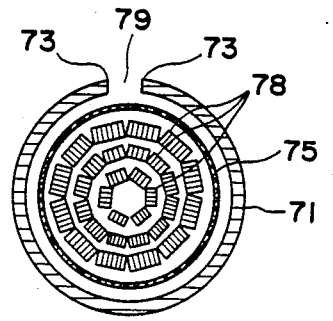
Fig. 6(a) Fig. 6(b) Fig. 6(c)
Fig. 7
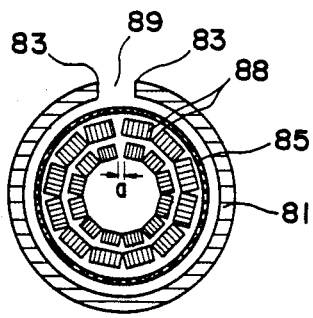
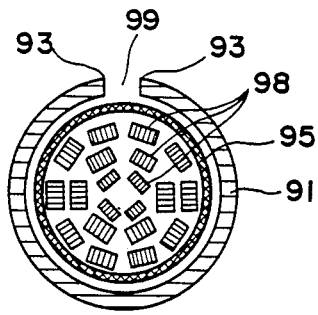
Fig. 8
Fig. 9

Fig. 10
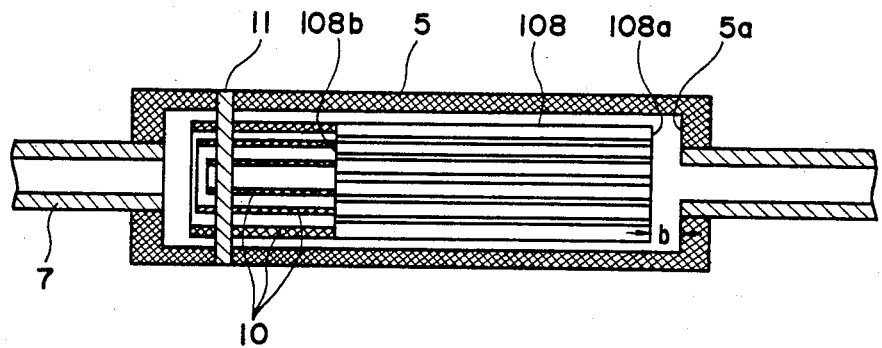
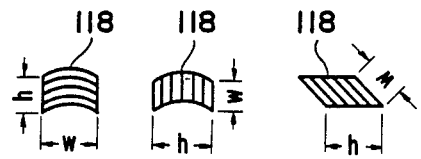
Fig.11(a) Fig.11(b) Fig.11(c)
Fig.12
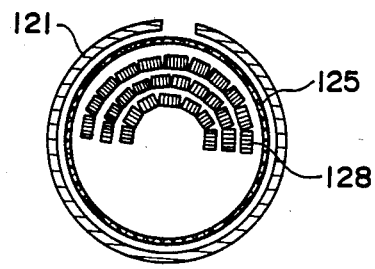
Fig.13
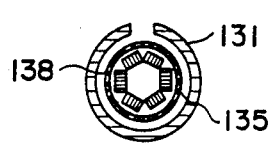
Fig.14
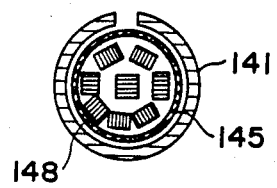

IMPEDER FOR ELECTRIC RESISTANCE TUBE WELDING

This application is a continuation of application Ser. No. 626,595, filed July 5, 1984, now abandoned, which in turn was a continuation of application Ser. No. 377,996, filed May 13, 1982, now abandoned.

BACKGROUND OF THE INVENTION

1. Field of the Invention:

This invention relates to an impeder for an electric resistance tube welding process for welding by heating opposite edge portions of a strip-skelp continuously formed into a tubular shape or a spirally tubular shape.

2. Description of the Prior Art:

In an electric resistance tube welding process, e.g., a high frequency induction tube welding process, the welding portion is constituted as shown in FIG. 1 of the accompanying drawings. That is, a skelp 1 formed into a tubular shape (hereinafter, referred to as a tubular skelp) is heated at the opposite edge portions by the action of eddy current induced in the tubular skelp 1 by passing a high frequency electric current through a coil 2 and the thus heated skelp is welded under pressure by means of squeeze rolls 4. An impeder used for improving welding energy utilization efficiency by concentrating the eddy current in the opposite edge portions is composed of an impeder casing 5 made of an insulating material and a core 6 made of a ferromagnetic material, and a mandrel pipe 7 connected to said impeder casing 5, and the core 6 is continuously cooled by cooling water supplied from said mandrel pipe 7.

The purpose of using an impeder is to improve the welding energy utilization efficiency of the electric resistance tube welding process. The performance of the impeder is determined by the characteristics of the core, which must have high magnetic permeability and high saturation flux density. That is, for improving the welding energy utilization efficiency in the electric resistance tube welding process, it is necessary to pass a large amount of magnetic flux through the core of the impeder.

The magnetic flux ($\phi$) passing through the core is the product of the magnetic flux density (B) and the transverse cross-sectional area (A) of the core. The amount of the magnetic flux is shown by the following equation (1)

$$\phi = B \times A \tag{1}$$

In this specification what is meant by the transverse cross-sectional area of the core or a laminated metal body is the area of the cross section taken in the direction perpendicular to the longitudinal direction of the impeder.

In conventional impeders, a ferrite core consisting of a magnetic oxide prepared by sintering a powdered oxide has been used.

In the case of the electric resistance tube welding process, the magnetic flux density (B) of the ferrite core is liable to saturate since the welding electric current is large and has a high frequency so that, particularly if the diameter of the tube is small, the transverse cross-sectional area (A) of the ferrite core becomes small and hence the magnetic flux density of the ferrite core approaches saturation at a relatively small welding electric current. In this case, as is clear from the above equation (1), the magnetic flux ($\phi$) if the core approaches saturation and the welding energy utilization efficiency declines.

As a countermeasure to this problem, ferrite core makers have developed improved core materials with increased saturation flux density ($B_s'$). Although $B_s'$ values of about 0.5 tesla have been obtained, the degree of improvement is not yet satisfactory. There are core materials having a saturation flux density higher than that of the ferrite core, for example metallic magnetic materials such as silicon steel, low carbon steel, Permalloy (trade name), amorphous metals, etc., and a metallic magnetic material rolled to a thickness of 0.3–0.35 mm and heat-treated has been used as an iron core for transformers etc. for use with ordinary line current (50–60 Hz).

In the case of the electric resistance tube welding process, since the welding electric current used in the process is a large electric current having a high frequency (10–500 KHz), the impeder is exposed to a high magnetic flux density having a high frequency and thus a large eddy current is generated in the core which increases the temperature thereof. Also, since the eddy current is generated in proportion to the square of the magnetic flux density and the square of the frequency, the amount of heat generated by the core in the electric resistance tube welding process is very much larger than that of cores used at line frequency. Therefore, in the case of a metallic magnetic materials generating a large amount of heat by an eddy current, it is impossible to keep the temperature of the core of the impeder below the Curie point by cooling it with cooling water, which is the usual cooling method used industrially. Thus, the core loses its ferromagnetism and cannot be used as the core of an impeder. This is the reason that a ferrite core generating a small amount of heat by the eddy current in the high frequency region is used in the electric resistance tube welding process.

SUMMARY OF THE INVENTION

The object of this invention is to provide an impeder for electric resistance tube welding having good welding energy utilization efficiency and excellent durability by using as the core of the impeder laminated bodies consisting of very thin foils of metallic magnetic material such as silicon steel, low carbon steel, Permalloy, amorphous metal, etc.

That is, according to this invention, there is provided an impeder for electric resistance tube welding comprising a core consisting of a plurality of laminated bodies each consisting of very thin foils of metallic magnetic material such as silicon steel, low carbon steel, Permalloy, amorphous metal, etc.

BRIEF DESCRIPTION OF THE DRAWINGS

FIG. 4, FIG. 7, FIG. 8, FIG. 9, FIG. 12, FIG. 13, and FIG. 14 are transverse cross-sectional views of various embodiments of the apparatus shown in FIG. 1 taken along the line A—A thereof for various uses of the core of this invention, FIG. 5(a), FIG. 5(b), FIG. 5(c), FIG. 6(a), FIG. 6(b) and FIG. 6(c) show various embodiments in which laminated metal bodies are arranged in contact with each other in various manners to constitute apparent laminated metal cores.

FIG. 10 is a longitudinal sectional view of the apparatus of FIG. 1 taken along the line B—B thereof, and FIG. 11(a), FIG. 11(b) and FIG. 11(c) are transverse cross-sectional views showing variously shaped embodiments of the laminated metal body according to this invention.

DESCRIPTION OF THE PREFERRED EMBODIMENTS

Now, this invention will be explained in detail in conjunction with the embodiments shown in the accompanying drawings.

Figure 2:
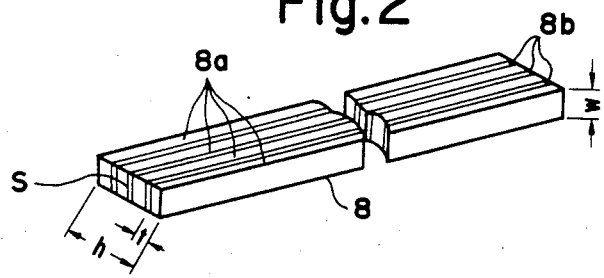
FIG. 2 is a perspective schematic view of an embodiment of a laminated metal core body according to this invention.

FIG. 2 shows an embodiment of a laminated metal body 8 composed of very thin foils of metallic magnetic material which is used to form the core of the impeder of this invention. The laminated metal body 8 is composed of very thin foils 8a (hereinafter, are referred to as metal foils) of a metallic magnetic material having a higher saturation magnetic flux density than that of a ferrite core, such as silicon steel, etc., which are adhered to and insulated from each other by an electrically insulating material such as a glassy film or epoxy resin.

The thickness (t) and the width (w) of the metal foils 8a are preferably less than 0.1 mm and 10 mm, respectively, and in practice the thickness (t) and the width (w) of the metal foils 8a are 0.005–0.1 mm and 1–10 mm, respectively. It is preferred that when the width (w) of the metal foil 8a is greater than 5 mm, the thickness (h) of the laminated metal body 8 is selected so as to make the transverse cross-sectional area ($S = w \times h$) of said laminated metal body between 5 and 20 mm². Also, it is difficult by available industrial techniques to completely insulate the metal foils 8a constituting the laminated metal 8 from each other. For the purpose of this invention, however, it is sufficient that the resistance between the layers or metal foils of the laminated metal body 8 be higher than about 1 kΩ. In addition, it is preferable that the metal foils 8a having a small thickness (t) and narrow width (w). Also, it is preferred that the resistance between the layers of the laminated metal body 8 be large and the thickness (h) of the laminated metal 8 be as small as possible within the range of workability. Furthermore, it is preferred that the laminated metal 8 be coated with varnish, etc.

The desirable ranges described above were determined on the basis of ease of cooling, that is on the basis of heat generation, and magnetic characteristics.

Figure 3:
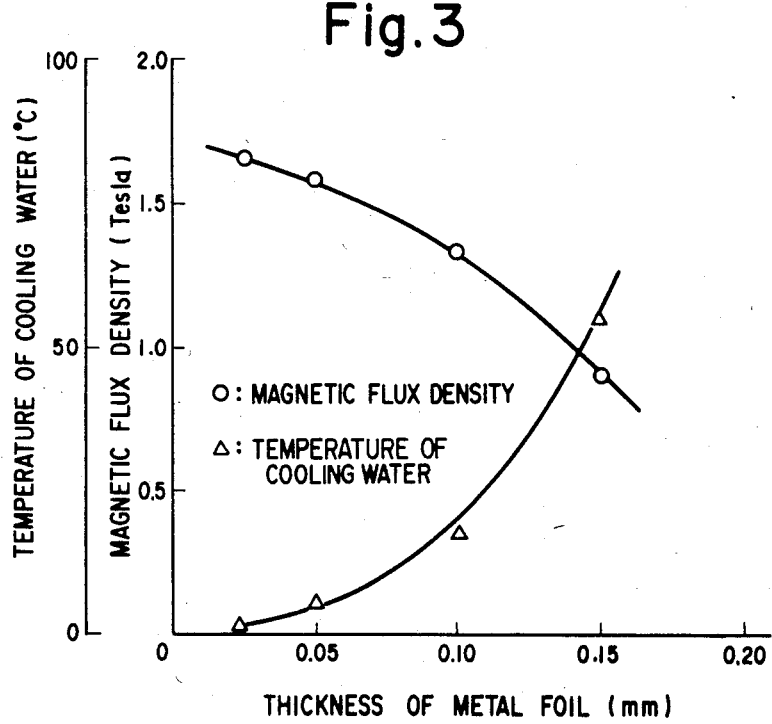
FIG. 3 is a graph showing the relation between the thickness of the metal foil of the laminated metal body and the cooling temperature and the relation between the thickness of the metal foils of the laminated metal body and magnetic flux density.

FIG. 3 shows graphic data obtained in experiments conducted to determine these desirable ranges. FIG. 3 is a graph showing the relation between the thickness of the metal foils and the magnetic flux, when the frequency is 100 KHz and the amount of cooling water is 18 liters/min. When the thickness (t) of the metal foils 8a increases, the magnetic flux passing through the laminated metal body 8 decreases and the heat generated by the laminated metal body 8 increases exponentially.

When the thickness (t) of the metal foil 8a is increased up to about 0.15 mm, the magnetic flux density becomes about twice the saturation magnetic flux density ($B_s' \simeq 0.5$ tesla) of a conventional ferrite core but the generation of heat in the laminated metal body 8 increases too quickly for use of the body in an impeder. On the other hand, when the thickness (t) of the metal foil 8a is 0.1 mm, the magnetic flux density is about 2.7 times the saturation flux density of a conventional ferrite core and the generation of heat in the laminated metal 8 is low enough for the laminated metal body to be used in an impeder employing an industrially applicable cooling method using water as the coolant.

With regard to the disposition of the laminated metal bodies in the impeder casing, as shown in FIG. 4, it is preferred to dispose the laminated metal bodies 48 in such a manner that the surfaces of each laminated metal body make the best possible contact with the cooling water, that is, so that the cooling water passes through the spaces between the inside surface of the impeder casing 45 and the laminated metal bodies 48 as well as the spaces between the laminated metal bodies 48 themselves. In FIG. 4, the numeral 41 denotes a tubular skelp, 43 opposite edge portions, and 49 an opening.

On the other hand, as is understood from equation (1), in a magnetic field which causes the magnetic flux density to reach the saturation value, the magnetic flux ($\phi$) passing through the impeder becomes larger as the transverse cross-sectional area (A) of the core becomes larger. Therefore, under a strong magnetic field, it is advantageous for the purpose of increasing welding energy utilization efficiency to dispose a larger number of laminated metal bodies in the impeder casing but if the laminated metal bodies are in contact with each other, it sometimes happens that the cooling efficiency is reduced.

When a plurality of the laminated metal bodies 58 are arranged adjacent to each other so as to appear to constitute a single laminated metal body (such a laminated metal body being hereinafter referred to as an "apparent laminated metal body") as shown in FIG. 5(a), FIG. 5(b) and FIG. 5(c) and when the length (h' or w') of the apparent laminated metal body 58' is greater than 5 mm and less than 10 mm, it is desirable that the length (w' or h') of the other side thereof be selected so that the transverse cross-sectional area [S'] ($S' = h' \times w'$) of the apparent laminated metal body 58' is less than 50 mm², while when the length (h' or w') of one side is over 10 mm, it is desirable that the length (w' or h') of the other side be less than 5 mm. The same also applies when a plurality of apparent laminated metal bodies 58' are further combined to constitute a single apparent laminated metal body. In addition, when one side of an apparent laminated metal body 68 is arranged to be in contact with the side of another apparent laminated metal body 68 to constitute an L-shape or T-shape apparent laminated metal body 68' as shown in FIG. 6(a), FIG. 6(b) and FIG. 6(c), there is no limitation on the transverse cross-sectional area (S") of the apparent laminated metal body 68'. By the transverse cross-section area of the laminated metal body is meant the area of the section of the laminated metal body in the direction perpendicular to the longitudinal direction of the impeder casing.

When the core consisting of an assembly of laminated metal bodies according the this invention (hereinafter referred to as a "metal core") is used, an improvement in the welding energy utilization efficiency over that of the conventional process is attained to the extent that the transverse cross-sectional area (A") of the metal core satisfies the condition shown by inequality (2)

showing the relation of the total flux in a conventional ferrite core to the total flux in the core of this invention;

$$A' \times B_s' < A'' \times B_s'' \qquad (2)$$

wherein
- $A'$ is the transverse cross-sectional area of the ferrite core used in the conventional process,
- $B_s'$ is the saturation flux density of the ferrite core used in the conventioal process,
- $A''$ is the transverse cross-sectional area of the metal core of this invention, and
- $B_s''$ is the saturation flux density of the metal core of this invention.

When the magnetic flux density is at the saturation value, it is advantageous for improvement of the welding energy utilization efficiency to increase the transverse cross-sectional area ($A''$) of the metal core, but when the magnetic flux density of the metal core has not reached the saturation flux density since the transverse cross-sectional area ($A''$) of the metal core is sufficiently large relative to the magnetic field formed by a high frequency electric current passing through the work coil (FIG. 1), increasing the transverse cross-sectional area ($A''$) of the metal core does not improve the welding energy utilization efficiency very much. In such a case, it is advantageous from the economical aspect as well as the aspect of workability to reduce the transverse cross-sectional area ($A''$) of the metal core to the extent that this reduction does not cause the magnetic flux density of the metal core to reach the saturated value.

In addition, with regard to the disposition of the laminated metal bodies constituting the metal core in the impeder casing, the laminated metal bodies may be disposed as desired insofar as they are arranged so as to permit sufficient cooling and are provided in a number satisfying the condition of equation (2). There is no particular restriction on how the laminated metal bodies are disposed. In other words, even when they are randomly disposed, the welding energy efficiency is still improved.

However, in the case of welding a pipe having a small diameter, the transverse cross-sectional area of the impeder casing is usually small. In such cases, if a random arrangement is used, it may become difficult to dispose the large number of laminated metal bodies required to be disposed in the impeder without reducing the cooling efficiency. Also, rolling of the tubular skelp or twisting of the impeder may sometimes occur in an electric resistance welding tube and in such cases the welding energy utilization efficiency may change. In particular, there is a tendency for this to happen when the transverse cross-sectional area of the laminated metal body is large.

In order to overcome these difficulties, laminated metal bodies 78 are disposed in an impeder casing 75 so as to form concentric circles with respect to the cross section of the impeder casing 75 as shown in FIG. 7. In other words, the laminated metal bodies are disposed in the impeder casing 75 in such a manner that both edges of the face of each laminated metal body 78 directed toward the center of the impeder casing 75 are in contact with the edge corners of the adjacent laminated metal bodies so that the laminated metal bodies 78 form apparent concentric cylinders. The number of the concentric cylinders formed by the laminated metal bodies 78 in the impeder casing 75 shown in FIG. 7 is three but there is no restriction on the number of apparent concentric cylinders.

In addition, in the case of disposing a plurality of apparent concentric cylinders formed by the laminated metal bodies 78 in the impeder casing 75, if the distance between the outside diameter of any given apparent concentric cylinder and the inside diameter of the next apparent concentric cylinder in the outward direction is about 1 mm, the required amount of cooling water can pass through the space between the outer concentric cylinder and the inner concentric cylinder.

Furthermore, as shown in FIG. 8, it is preferred to form a slight gap (a) (of about 0.2-1 mm) between the laminated metal bodies 88 disposed under the opening 89 formed between the opposite edge portions 83 of the tubular skelp 81. In the figure, the numeral 85 denotes the impeder casing.

When it is possible to make the transverse cross-sectional area of the core large relative to the magnetic field formed by the high frequency electric current passing through the work coil 2 (FIG. 1), better cooling efficiency and longer core life can be obtained by disposing the laminated metal bodies 98 constituting the concentric cylinders so that they are spaced from each other as shown in FIG. 9. In this case, it is unnecessary to form a gap between the laminated metal bodies 98 disposed under the opening 99 of the tubular skelp 91.

Figure 1:
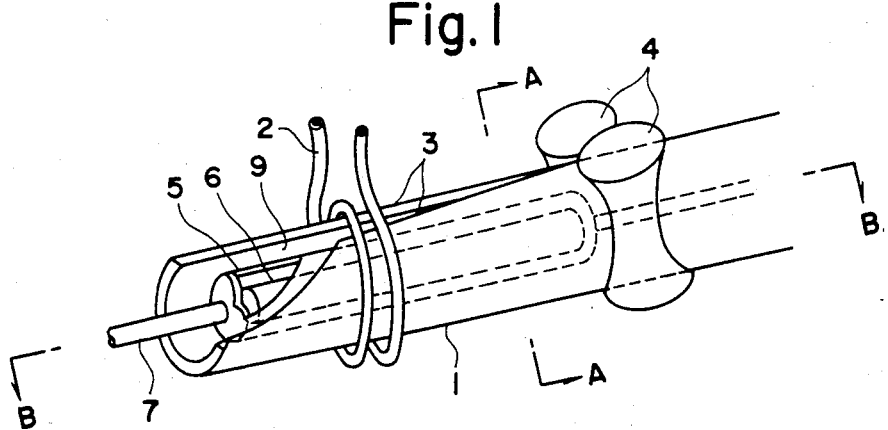
FIG. 1 is a perspective schematic view of the heat-welding portion used in a high frequency induction tube welding process.

FIG. 10 is a longitudinal sectional view taken along line B—B of FIG. 1 and showing the impeder according to this invention used in the apparatus shown in FIG. 1. The impeder core, which is an assembly of the laminated metal bodies 108, is placed in the impeder casing 5 with a space (b) (b=2-5 mm) left between the downstream end 108a of the impeder core and the downstream end 5a of the impeder casing 5. The laminated metal bodies 108 are connected or fixed to supports 10 composed of a non-metallic insulator material such as an epoxy resin at the opposite or upstream end 108b of the laminated metal bodies 108 and further the supports 10 are fixed to the impeder casing 5 by means of a pin 11. It is preferred that the supports 10 be fixed to the laminated metal bodies 108 with an insulating adhesive such as an epoxy resin and the supports 10 can be utilized as a frame when the bodies are arranged in the apparent concentric cylinders. In addition, the pin 11 may be made of metal if the upstream end 108b of the laminated metal bodies 108 is sufficiently spaced from the pin 11. Also, in FIG. 10, each of the laminated metal bodies 108 is constituted as a single body without joints in the lengthwise direction of the impeder casing 5, but the laminated metal bodies 108 may also be constituted by connecting a plurality of laminated metal bodies in the lengthwise direction of the impeder casing 5.

The advantages of this invention will be explained.

By laminating metal foils each of which is very thin and narrow in a manner such that the metal foils are electrically insulated from each other to form a laminated metal body having a small cross-sectional area, and using a plurality of these laminated metal bodies as the core of an impeder, and impeder generating less heat by eddy current and having good cooling efficiency can be obtained. Thus, the temperature of the core of the impeder can be kept sufficiently below the Curie point by cooling with cooling water in the way usually performed industrially. As a result, an impeder providing excellent welding energy utilization efficiency can be obtained.

Also, by concentrically disposing apparent cylinders each composed of laminated metal bodies as shown in FIG. 7 and FIG. 8, the metal foils constituting the laminated metal bodies can be radially distributed from the center of the impeder casing and hence a stable, high welding energy utilization efficiency is always obtained, even when rolling of a tubular skelp or twisting of the impeder occurs during the tube welding process.

Furthermore, by forming a small space or gap between the laminated metal bodies 88 disposed under the opening 89 of the tubular skelp 81 as shown in, for example, FIG. 8, the magnetic flux formed by the high frequency electric current passing through the work coil can pass through the laminated metal bodies 88 disposed in the inner portion of the impeder casing without being magentically shielded by the laminated metal bodies 88 disposed in the outer portion of the impeder casing.

Still further, by supporting the upstream ends 108b of the laminated metal bodies 108 and forming a space (b) between the downstream ends 108a of the laminated metal bodies and the inside wall of the downstream end 5a of the impeder casing 5 as shown in FIG. 10, the hydraulic pressure of cooling water supplied from a mandrel pipe into the electric resistance welding tube does not act as a compressive force on the laminated metal bodies 108. Therefore, deformation and stripping of the laminated metal bodies 108 can be prevented, whereby the life of the core of the impeder is greatly prolonged.

Moreover, in performing electric resistance tube welding, the intensity of the magnetic field differs in the direction of the longitudinal axis of the tube. That is, since the intensity of the magnetic field under the work coil is strongest, it sometimes happens that the insulating adhesive of the laminated metal bodies located under the work coil deteriorates because it is extraordinarily heated. In such a case, if the impeder core is constituted by the laminated metal bodies connected in the lengthwise direction of the impeder casing according to an embodiment of this invention, only the deteriorated laminated metal bodies need be replaced with new laminated metal bodies and hence the invention is economical.

In addition, the transverse cross-sectional shape of the laminated metal bodies is not limited to the shape illustrated in FIG. 2 but it may be an arc shape or a parallelogramic shape as shown by numeral 118 in FIG. 11 and in such cases, the thickness (h), width (w), and the transverse cross-sectional area (S) of the laminated metal bodies are the same as those discussed with regard to the embodiment shown in FIG. 2. Also, in the embodiments illustrated in FIG. 7, FIG. 8, and FIG. 9, the laminated metal bodies are uniformly disposed on a concentric circle or concentric circles but if a sufficient transverse cross-sectional area of the laminated metal bodies is obtained relative to the magnetic field formed by the work coil, the laminated metal bodies 128 may be disposed on only a part of a concentric circle or circles in an impeder casing 125 as shown in FIG. 12. The numeral 121 in this figure denotes a tubular skelp. Furthermore, when the cross sectional area of the impeder casing is small, the laminated metal bodies may be disposed as shown in FIG. 13 and FIG. 14, wherein numereals 131 and 141 denote a tubular skelp, 135 and 145 an impeder casing, and 138 and 148 laminated metal bodies.

An impeder using a laminated core consisting of metallic magnetic material has been known to the art as disclosed, for example, in Japanese Patent Public Disclosure No. 55(1980)-10390. The characterizing feature of this prior art impeder is that a laminated member formed of magnetizable steel strips is oriented so that the face of the laminated steel strips is held parallel to a plane passing through both the opening in the tubular shaped skelp and the longitudinal axis thereof. The invention is, however, directed solely toward maintaining this feature in the course of the tube welding operation and there is very little concrete description regarding the core.

The differences between this prior art impeder and the impeder according to the present invention are summarized in Table 1. From this table it is obvious that the two differ in structure. More specifically, in the present invention a required number of laminated bodies each formed from very thin, very narrow metallic foils so as to have a small cross-sectional area are arranged so as to afford high cooling efficiency. As a result, there is obtained improved welding heat utilization over a wide range of frequencies extending from 10 to 500 KHz. Moreover, by arranging these laminated bodies having small cross-sectional area on concentric circles with the metallic foils oriented radially, there can be obtained a core of large cross-sectional area and an impeder capable of providing highly stable heat utilization efficiency independently of variations in relative position between the core and the tubular skelp.

On the other hand, the impeder according to Japanese Patent Public Disclosure No. 55(1980)-10390 can, from the descriptions and the drawings contained in this Public Disclosure, be presumed to use only a single laminated body as the core, which explains why the impeder is used only within a narrow range of low frequencies (30–90 KHz).

TABLE 1

| Constituent factors | This invention | Japanese Public Disclosure 55(1980)-10390 |
| --- | --- | --- |
| Thickness of metallic magnetic material (t) | 0.1 mm max. | Not disclosed |
| Width of metallic magnetic material (w) | 1–10 mm | " |
| Thickness of metallic metal body (h) | No restriction on value of h when w < 5 mm Value of h determined according to equation (3) when 5 mm ≦ w ≦ 10 mm | " |
| Cross-sectional area of laminated body (S) | (When 5 mm ≦ w ≦ 10 mm) $S = w \times h \leq 50 \text{ mm}^2 \ldots (3)$ | " |
| Resistance between layers of laminated body | 1 KΩ minimum | " |
| Number of laminated bodies | Plurality, with A" satisfying equation (2) | Presumed to be one |

TABLE 1-continued

| Constituent factors | This invention | Japanese Public Disclosure 55(1980)-10390 |
|---|---|---|
| Orientation of metallic magnetic material | 1. May be randomly oriented<br>2. Preferably oriented radially | Parallel to a plane passing through both the opening in the tubular shaped skelp and the longitudinal axis thereof. |
| Operational frequency range | 10 KHz–500 KHz | 30 KHz–90 KHz |

From the considerations described above, it is obvious that the impeder according to Patent Public Disclosure No. 55(1980)-10390 is different from that of the present invention in structure, operation and effect.

The effect of the present invention will now be explained in comparison with that of the conventional impeder.

Details regarding the examples used for the comparison are shown in Table 2.

An example of carrying out the high frequency induction tube welding process using the impeder of this invention is shown in Table 2 together with a comparative example of carrying out the same tube welding process using a conventioal impeder.

In addition, the welding energy utilization coefficients in the case of using the impeder of this invention and the case of using the conventional impeder in the tube welding process may be compared on the basis of the amount of electric power required (the product of the plate voltage and the plate current of the oscillator).

As is clear from the results shown in Table 2, by using the impeder of this invention, the welding energy utilization efficiency can be greatly improved and power consumption can be reduced by more than 30%. On the other hand, a conventional impeder using a ferrite core undergoes deterioration in ferromagnetism during use and must be replaced, while the impeder of this invention exhibits such excellent effects that a durability of about 1.3 times that of a conventional impeder, etc., is obtained.

continuously formed into a tubular or spirally tubular shape having spaced opposed edge portions defining a gap therebetween has the edge portions heated and pressed together for being welded, said impeder comprising:

a generally tubular casing; and a core enclosed within said casing consisting of a plurality of laminated bodies each having a transverse cross-sectional area of not more than 50 mm$^2$ and an interlaminar resistance of not less than 1 K$\Omega$ and consisting of a plurality of substantially flat planar foils of metallic magnetic material 5 to 100 $\mu$m in thickness and 1 to 10 mm in width, said core, when viewed in cross-section transverse to the central longitudinal axis of said casing, having the transverse cross-sections of said laminated members included within at least one circle concentric with the said longitudinal axis of said casing and having the planes of the foils in each laminated member extending substantially parallel to said longitudinal axis and radially outwardly from said longitudinal axis.

2. An impeder as claimed in claim 1 further comprising means forming part of said casing for conducting a cooling fluid through said casing from one end of said casing to the other, and supports at the ends of said laminated bodies which are toward said one end of said casing and on which said laminated bodies are mounted for being held in their positions.

3. An impeder as claimed in claim 1 wherein said

TABLE 2

| | Example of the invention | | Comparative example |
|---|---|---|---|
| Welded tube specimen | Dimensions of tube: 34.0 $\phi$mm × 4.2 t mm<br>Kind of steel: 0.28% C steel | | Dimensions of tube: 34.0 $\phi$mm × 4.2 t mm<br>Kind of steel: 0.28% C steel |
| Welding apparatus | High frequency induction welding apparatus<br>Frequency: f = 180 KHz | | High frequency induction welding apparatus<br>Frequency: f = 180 KHz |
| Impeder Material<br>Core | 3% silicon steel<br>Thickness of metal foil: 0.05 mm<br>Width of metal foil: 2.5 mm | Fe—B—Si amorphous alloy<br>Thickness of metal foil: 0.025 mm<br>Width of metal foil: 2.5 mm | Mn—Zn series ferrite |
| Dimensions | Thickness of laminated metal bodies: 2.5 mm | Thickness of laminated metal body: 2.5 mm | Outer diameter: 18 $\phi$mm<br>Inside diameter: 9 $\phi$mm |
| Shape | Length of laminated metal bodies: 400 mm | Length of laminated metal body: 400 mm | Length: 400 mm |
| Core arrangement in impeder casing | Number of laminated metal bodies: 24<br>Double concentric structure | Number of laminated metal body: 24<br>Double concentric structure | Only one core |
| Resistance between layers | 10K$\Omega$ | 10k$\Omega$ | — |
| Saturation flux density | 2.0 tesla | 1.6 tesla | 0.5 tesla |
| Welding speed | 50 m/min. | 50 m/min. | 50 m/min. |
| Electric power required | 514 KW | 530 KW | 750 KW |

What is claimed is:

1. An impeder for use in an apparatus for electric resistance tube welding by which a strip-shaped skelp laminated bodies are in a plurality of concentric circles.

* * * * *